(12) United States Patent
Park et al.

(10) Patent No.: US 9,022,435 B2
(45) Date of Patent: May 5, 2015

(54) TRUNK SWITCH ASSEMBLY INTEGRATED WITH EMBLEM

(71) Applicants: Hyundai Motor Company, Seoul (KR); Dae Dong Co., Ltd., Ansan-si, Gyeonggi-do (KR)

(72) Inventors: Jung Hoon Park, Yongin-si (KR); Sam Min Park, Ansan-si (KR)

(73) Assignees: Hyundai Motor Company, Seoul (KR); Dae Dong Co., Ltd., Ansan-Si, Gyeonggi-Do (KR)

( * ) Notice: Subject to any disclaimer, the term of this patent is extended or adjusted under 35 U.S.C. 154(b) by 178 days.

(21) Appl. No.: 13/798,871

(22) Filed: Mar. 13, 2013

(65) Prior Publication Data

US 2014/0159390 A1  Jun. 12, 2014

(30) Foreign Application Priority Data

Dec. 11, 2012  (KR) ........................ 10-2012-0143652

(51) Int. Cl.
*E05C 3/06* (2006.01)
*E05B 1/00* (2006.01)
*E05B 85/10* (2014.01)
*E05B 81/76* (2014.01)
*B60R 16/00* (2006.01)
*E05C 3/16* (2006.01)
*E05B 83/18* (2014.01)

(52) U.S. Cl.
CPC .............. *E05B 1/0007* (2013.01); *E05B 85/10* (2013.01); *E05B 81/76* (2013.01); *E05B 83/18* (2013.01); *B60R 16/005* (2013.01); *Y10S 292/14* (2013.01)

(58) Field of Classification Search
USPC ........................................................ 292/217
See application file for complete search history.

(56) References Cited

U.S. PATENT DOCUMENTS

| 1,556,864 | A | * | 10/1925 | Mendenhall | ..................... 292/33 |
| 3,594,529 | A | * | 7/1971 | Cartwright | ..................... 200/330 |
| 8,129,639 | B2 | * | 3/2012 | Youn et al. | ................. 200/61.62 |
| 2010/0116635 | A1 | * | 5/2010 | Youn et al. | ..................... 200/341 |

FOREIGN PATENT DOCUMENTS

| KR | 10-2005-0087159 A | 8/2005 |
| KR | 10-0783533 B1 | 12/2007 |
| KR | 10-2009-0050830 A | 5/2009 |
| KR | 10-2010-0053809 A | 5/2010 |
| KR | 10-1030972 B1 | 4/2011 |

* cited by examiner

*Primary Examiner* — Mark Williams
(74) *Attorney, Agent, or Firm* — McDermott Will & Emery LLP

(57) ABSTRACT

A trunk switch assembly integrated with an emblem, includes a body; an emblem knob that is coupled with an outer side of the body so as to have an emblem provided on an outer surface thereof and provided with a switch operating rib. The trunk switch assembly further includes a micro switch that is provided in a switch case; a pad that is provided between the emblem knob and the body and provided with a link portion having one part transferring a vertical motion of the emblem knob at the same stroke; and a return spring that is provided on the body to apply the pressing and restoration operating force of the emblem knob. The switch operating rib operates the micro switch according to the pressing motion of the emblem knob.

10 Claims, 6 Drawing Sheets

TRUNK SWITCH ASSEMBLY INTEGRATED WITH EMBLEM

CROSS-REFERENCE TO RELATED APPLICATION

This application claims priority to Korean Patent Application No. 10-2012-0143652, filed on Dec. 11, 2012 in the Korean Intellectual Property Office, the disclosure of which is incorporated herein in its entirety by reference.

FIELD OF THE INVENTION

The present disclosure relates to a trunk switch assembly integrated with an emblem, and more particularly, to a trunk switch assembly integrated with an emblem having a trunk open switch attached to an emblem, and having a waterproof structure provided therein, to thereby improve ability to open the trunk and convenience of the trunk, avoid design restrictions, and operate at the same stroke upon whichever part of the emblem is pressed.

BACKGROUND

Generally, emblems with automakers' logos are mounted or attached on the front and rear of a car. When the emblem is attached to the rear of a car, the emblem is generally attached to a surface of a trunk.

The emblem mounted on the rear of a car is attached to the trunk surface with an adhesive, a screw, or the like. The attached emblems are produced separately and thus are attached to the trunk surface one by one manually, such that a process to manufacture a car may take a long time. In addition, the emblem attached to the trunk surface with an adhesive, or the like, becomes separated from the trunk surface over time, which damages the appearance of a car.

In order to resolve the above problems, KR Patent Laid-Open Publication No. 10-2010-0053809 entitled "Emblem-Unified Trunk Opening and Closing Device" reduces complexity in attachment of an emblem and improves durability by integrating an emblem with the trunk opening and closing apparatus. However, this emblem-attached trunk opening and closing device in the prior art is not provided with a waterproof structure such that moisture may permeate thereinto. The switch is pressed only if a middle part of the emblem is pressed, such that the operability of the trunk may be degraded.

SUMMARY

Accordingly, the present disclosure purports to solve the above-mentioned problems occurring in the prior art while advantages achieved by the prior art are maintained intact.

A need exists for providing a trunk switch assembly integrated with an emblem having a trunk open switch attached on an emblem to improve ability to open and convenience of the trunk, and having a waterproof structure provided therein. and The trunk switch assembly further purports to avoid design restrictions, and operates at the same stroke whichever part of the emblem is pressed to improve operability of the trunk.

An aspect of the present disclosure provides a trunk switch assembly integrated with an emblem. The trunk switch assembly includes a body; an emblem knob that is coupled with an outer side of the body so as to have an emblem provided on an outer surface thereof and provided with a switch operating rib; and a micro switch that is provided in a switch case provided in the body. The trunk switch assembly further includes a pad that is provided between the emblem knob and the body and provided with two link portions, each having one part transferring a vertical motion of the emblem knob at the same stroke; and a return spring that is provided on the body to apply the pressing and restoration operating force of the emblem knob. The switch operating rib enables the micro switch to operate according to the pressing motion of the emblem knob.

The trunk switch assembly integrated with an emblem may further include a link plate that is provided between the body and the switch case and rotatably connected with the link portions to move together with the link portions. The link portions are connected with both sides of the pad via one end of each of the link portions. One of the link portions may include a first link that has one end connected with the pad and the other end to which a first hinge point is coupled, and a third link that has one end connected with one part of the first link of the pad and the other end to which a second hinge point is coupled. The other of the link portions includes a second link that has one end rotatably connected with the first hinge point of the first link and the other end connected with the link plate; and a fourth link that has one end rotatably connected with the second hinge point of the third link and the other end connected with the link plate.

The first link may move horizontally by a vertical force transferred from the outer side of the emblem knob and transfer force to the first hinge point. The first hinge point may rotate by the force transferred from the first link, and the second link may move horizontally by the rotation of the first hinge point and transfer force to the link plate horizontally. The fourth link may move horizontally by a horizontal force transferred from the link plate and transfer force to the second hinge point, and the second hinge point may rotate by the force transferred from the fourth link, and the third link may move vertically by the rotation of the second hinge point.

The pad may be made of a rubber material to prevent moisture from coming into the micro switch.

An outer circumference of the emblem knob may be provided with a decoration, and a waterproof ring for waterproof may be provided between the decoration and the emblem knob.

The body may be provided with a drain hole so as to discharge moisture introduced thereinto. The drain hole may be provided in plural.

The guide holes extend inwardly from the body and have a hollow inside. The emblem knob may be provided with guide members that extend from the emblem knob to be inserted into the guide holes so as to prevent the emblem knob from shaking when the emblem knob is pressed.

The guide holes may be each provided at both sides of the body and the guide members may be each provided at both sides of the emblem knob so as to prevent the emblem knob from shaking left and right when the emblem knob is pressed.

The switch operating rib may extend inwardly from the emblem knob. Each of the pad and the body may be provided with a switch guide hole of which the inside is hollow so as to guide the switch operating rib, such that the switch operating rib moves vertically through the switch guide hole by the pressing operation of the emblem knob to press and operate the micro switch.

The trunk switch assembly integrated with an emblem may further include a sealing groove provided around the pad to prevent the introduction of foreign matter.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
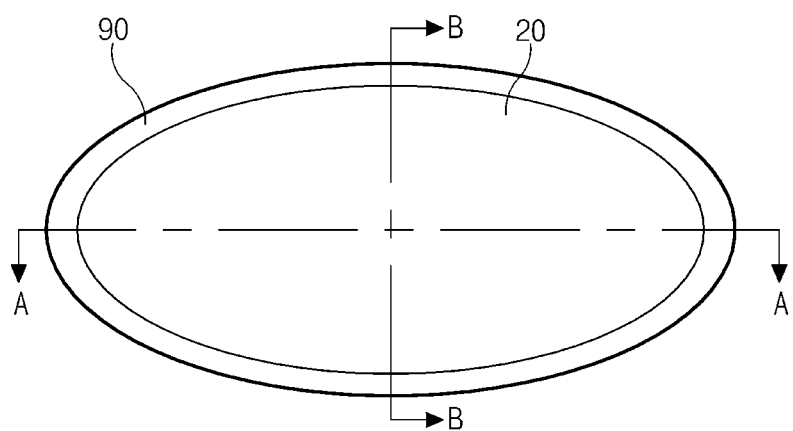
FIG. 1 is a diagram illustrating an appearance of a trunk switch assembly integrated with an emblem according to an exemplary embodiment of the present disclosure.
Figure 2:
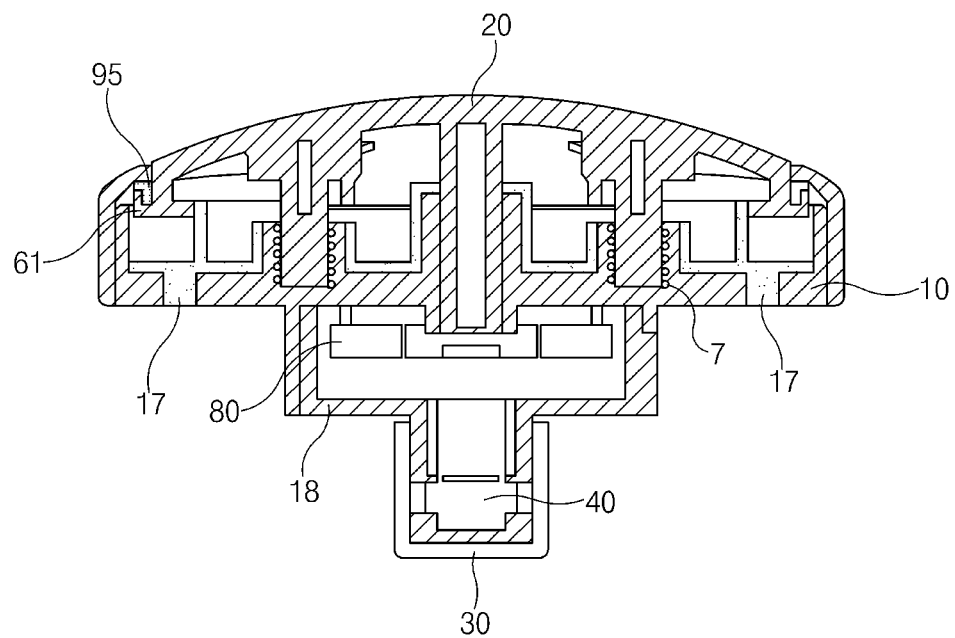
FIG. 2 is a cross-sectional view taken along the line B-B of FIG. 1.
Figure 3:
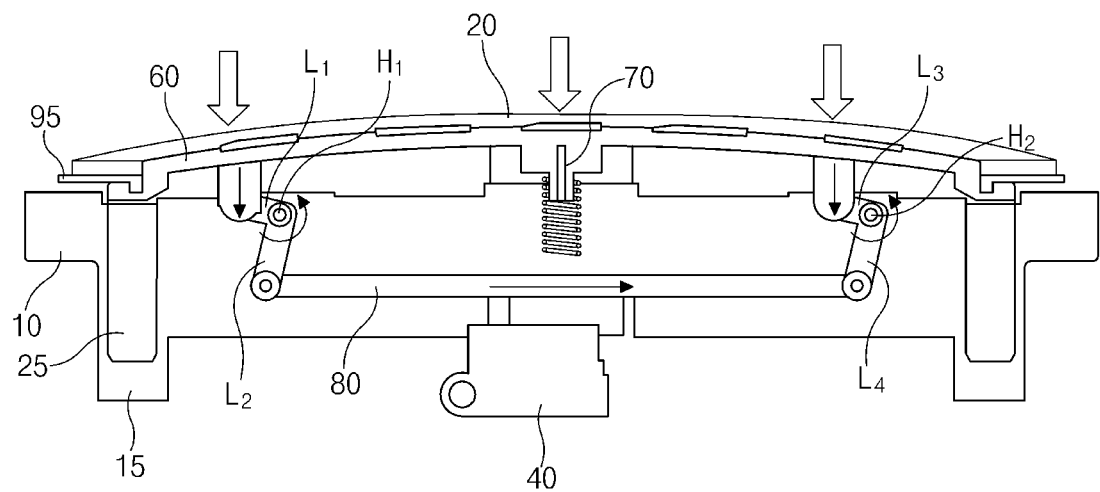
FIG. 3 is a cross-sectional view taken along the line A-A of FIG. 1 and a diagram illustrating an operation of a link portion.
Figure 4:
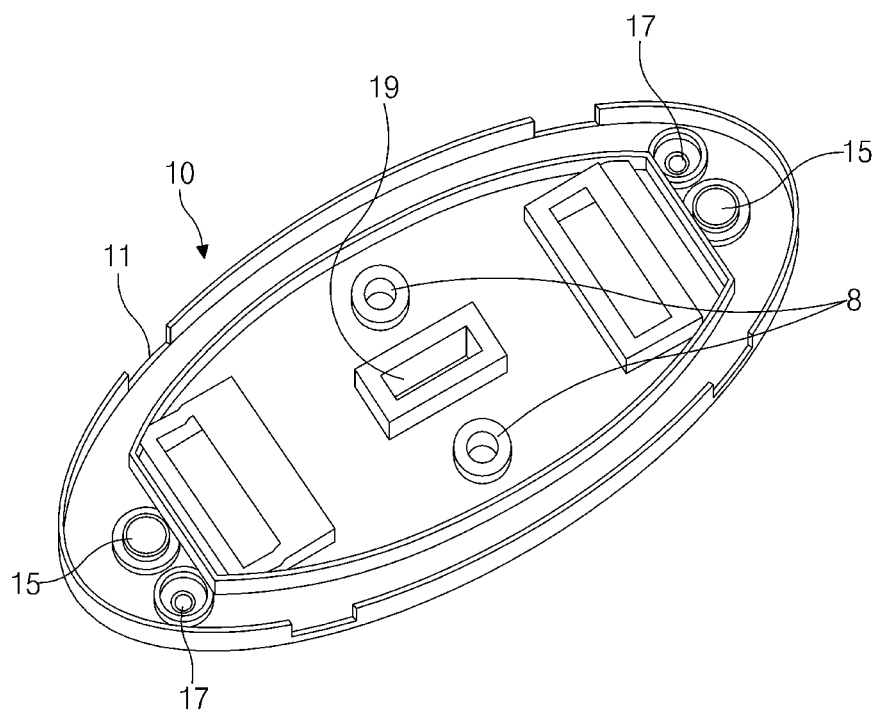
FIG. 4 is a diagram illustrating a body of the trunk switch assembly integrated with an emblem according to the exemplary embodiment of the present disclosure.
Figure 5:
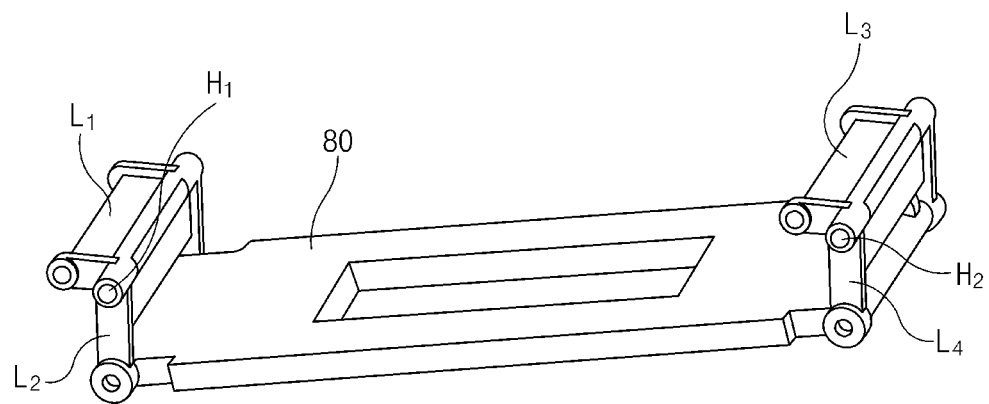
FIG. 5 is a diagram illustrating the link portion and a link plate of the trunk switch assembly integrated with an emblem according to the exemplary embodiment of the present disclosure.
Figure 6:
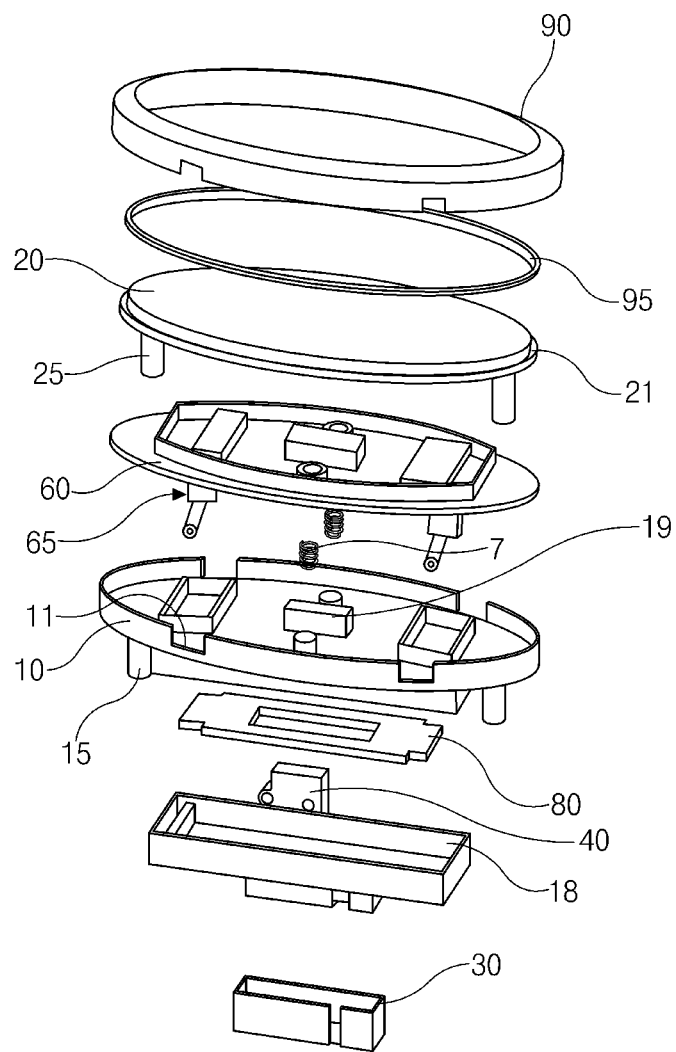
FIG. 6 is a diagram illustrating a configuration of components of a trunk switch assembly integrated with an emblem according to the exemplary embodiment of the present disclosure.

Hereinafter, exemplary embodiments of the present disclosure will be described with reference to the accompanying drawings. FIG. 1 is a diagram illustrating an appearance of a trunk switch assembly integrated with an emblem according to an exemplary embodiment of the present disclosure. FIG. 2 is a cross-sectional view taken along the line B-B of FIG. 1. FIG. 3 is a cross-sectional view taken along the line A-A of FIG. 1 and illustrates an operation of a link portion 65. FIG. 4 is a diagram illustrating a body 10 of the trunk switch assembly integrated with an emblem according to the exemplary embodiment of the present disclosure. FIG. 5 is a diagram illustrating the link portion 65 and a link plate 80 of the trunk switch assembly integrated with an emblem according to the exemplary embodiment of the present disclosure. FIG. 6 is a diagram illustrating components of a trunk switch assembly integrated with an emblem according to the exemplary embodiment of the present disclosure.

As illustrated in FIGS. 3 and 6, a trunk switch assembly integrated with an emblem according to an exemplary embodiment includes a body 10, and an emblem knob 20 that is coupled with an outer side of the body so as to have an emblem provided on an outer surface thereof, and is provided with a switch operating rib 70. The trunk switch assembly further includes a micro switch 40 that is provided both in a switch case 30 and the body 10, a pad 60 provided between the emblem knob 20 and the body 10, a return spring 7 that is provided on the body 10 to apply the pressing or restoration operating force of the emblem knob 20, a case 18 that is connected between the body 10 and the switch case 30 and has a hole provided therein, the micro switch 40 penetrating through the hole, and a link plate 80 that is provided in the case 18.

The emblem knob 20 has an emblem symbolizing an automaker provided on an outer surface thereof. The emblem knob 20 has a sealing groove 21 at its peripheral, for waterproof and preventing foreign substances from coming in from the outside. The sealing groove 21 is provided in a stepped form around the outer surface of the emblem knob 20.

A center of an inner side of the emblem knob 20 is provided with a switch operating rib 70 that enables the micro switch 40 to operate according to the motion of the emblem knob 20. The switch operating rib 70 extends vertically from the inner top surface of the emblem knob 20.

The bottom surface of the emblem knob 20 at its both ends are provided with guide members 25 that are inserted into guide holes 15 of the body 10. The guide members 25 vertically move within the guide holes 15, such that the guide members 25 may guide the entire emblem knob 20 so as to move vertically without shaking. The guide member 25 has a shape corresponding to that of the guide hole 15 of the body 10 and may preferably have a cylindrical shape so as to smoothly move in the vertical direction.

The outer circumference of the emblem knob 20 is coupled with a decoration 90. The decoration 90 serves to decorate an edge of the outer surface of the trunk switch assembly integrated with an emblem.

The sealing groove 21 provided on the emblem knob 20 is coupled with a waterproof ring 95 that is separately provided. The waterproof ring 95, which prevents moisture from coming in from the outside, serves to prevent moisture from permeating a clearance between the edge of the emblem knob 20 and the decoration 90.

The inner side of the emblem knob 20 is coupled with a pad 60. The pad 60 is made of a rubber material and serves to prevent moisture from permeating, together with the waterproof ring 95.

Referring to FIGS. 3, 5 and 6, the pad 60 is provided with two link portions 65. Each of the link portions 65 is inserted into a link mounting groove 11 that is provided on the body 10, such that the entire link portion 65 is provided in the body 10 and has one part coupled with the link plate 80. The link plate 80 is provided in the case 18 and mounted on the body 10. The link portions 65 are provided at both ends of the pad 60. Referring to FIG. 5, one of the link portions 65 includes a first link L1 having one end connected with the pad 60 and the other end on which a first hinge point H1 is formed, and a second link L2 having one end rotatably connected with the first link L1 through the first hinge point H1 and the other end connected with the link plate 80. The other link portion 65 includes a third link L3 having one end connected with the other part of the pad 60 and the other end on which a second hinge point H2 is formed, and, a fourth link L4 having one end rotatably connected with the third link L3 through the second hinge point H2 and the other end connected with the link plate 80.

Both parts of the link plate 80 are connected with the link portions 65, that is, the second link L2 and the fourth link L4 of the link portions 65, such that the part of the link plate 80 connected with the second link L2 and the other part of the link plate 80 connected with the fourth link L4 are integrally formed and the inside of the link plate 80 is formed with a hole through which the micro switch 40 penetrates so as to transfer the motion of the link portion 65 horizontally.

With reference to FIG. 3, the motions of the link portion 65 and the link plate 80 are described in more detail. When the outside of the emblem knob 20 is biasedly pressed to any one part, rather than the center, the first link L1 moves vertically by a vertical force that is biasedly transferred. Therefore, the first link L1 transfers force to the first hinge point H1 and the first hinge point H1 rotates by the force transferred from the first link L1. The second link L2 connected with the first hinge point H1 rotates together with the rotation of the first hinge point H1, such that the link plate 80 connected with the second link L2 moves with the horizontal force generated by the rotation of the second link L2 and the first hinge point H1.

The fourth link L4 having one part connected with the link plate 80 also moves horizontally together with the motion of the link plate 80 to transfer force to the second hinge point L2 and the second hinge point H2 rotates by the force transferred from the fourth link L4. The third link L3 connected with the second hinge point H2 rotates together with the rotation of the second hinge point H2, and thus moves vertically. As such, even though the position biased to any one part of the emblem knob 20 is pressed, both parts of the emblem knob 20 move at the same stroke due to the motions of the link portion 65 provided by the pad 60 connected with the emblem knob 20 and the link plate 80 connected with the link portion 65 to move the switch operating rib 70, such that the micro switch 40 operates.

The body 10 is coupled to the pad 60 and serves to support the entire trunk switch assembly integrated with an emblem.

Referring to FIG. 4, in the body 10, a switch guide hole 19 that guides the movement of the switch operating rib 70 is provided at a position corresponding to the switch operating rib 70 that is coupled to the emblem knob 20. The switch guide hole 19 is formed as a hole extending outwardly from the body 10 and having a hollow inside. The switch operating rib 70 vertically moves in the switch guide hole 19 to operate the micro switch 40 that is provided in the body 10.

In one side of the body 10, the guide hole 15 that extends inwardly from the body 10 and has a hollow inside is provided at a position to which the guide member 25 of the emblem knob 20 is coupled. Therefore, the guide member 25 of the emblem knob 20 is inserted into the hollow inside of the guide hole 15.

The body 10 is provided with a drain hole 17. The drain hole 17 is a hole that discharges moisture introduced thereinto and is provided for the waterproof of the trunk, in combination with the waterproof ring 95 and the pad 60 made of a rubber material. Therefore, a double waterproof structure prevents the moisture introduced thereinto from permeating into the micro switch 40. The drain hole 17 is provided in plural to easily discharge moisture to the outside.

Referring to FIGS. 2 and 4, the body 10 is provided with the return spring 7 and thereby elastically supports the entire emblem knob 20 to improve the operating force. To this end, the body 10 is provided with a return spring supporting member 8. The middle of the return spring supporting member 8 is provided with a groove and the bottom surface of the return spring supporting member is closed, such that the return spring 7 inserted into the groove of the return spring supporting member 8 penetrates through the pad 60 to elastically support the emblem knob 20. Therefore, when the emblem knob 20 is pressed from the outside, the return spring 7 is pressed and when the force pressing the emblem knob 20 is removed, the emblem knob 20 returns to an original position again by an elastic restoring force of the return spring 7. The plurality of return springs 7 may be preferably provided at positions symmetrical with each other so that the emblem knob 20 is applied with the uniform elastic restoring force.

The inside of the body 10 is provided with the case 18 in which the link plate 80 is received and the inside of the case 18 is connected with the switch case 30 in which the micro switch 40 is received. Therefore, the case 18 and the link plate 80 are provided with micro switch through holes so that the micro switch 40 may operate by the switch operating rib 70.

Referring to FIG. 3, in the trunk case integrated with an emblem provided by the foregoing configuration, when the outside of the emblem knob 20 is pressed, the switch operating rib 70 provided on the emblem knob 20 moves vertically, and thus contacts the micro switch 40 provided in the switch case 30, such that the micro switch 40 operates. In this case, the emblem knob 20 is pressed and applied with the restoration force by the return spring 7 that supports the entire emblem knob 20. Even though an area close to the peripheral side of the emblem knob 20, not the position at which the switch operating rib 70 of the emblem knob 20 is provided, is pressed, the switch operating rib 70 enables the micro switch 40 to operate by the motions of the link portion 65 of the pad 60 and the link plate 80. Further, it is possible to prevent moisture from coming thereinto due to the pad 60 made of a rubber material and the waterproof ring 95 provided at the outer side of the emblem knob 20 along the circumference of the emblem knob 20. This configuration achieves the double waterproof due to the drain hole 17 provided on the body 10 to discharge moisture to the outside even when moisture is introduced.

As set forth above, it is possible to improve ability to open the trunk and convenience of the trunk and avoid the design restrictions by attaching the trunk open switch to the emblem, have the waterproof structure provided in the trunk, and improve the operability of the trunk by operating at the same stroke whichever part of the emblem is pressed.

The present disclosure is described with reference to the embodiments illustrated in the drawings, which are only example and can be implemented by various embodiments. Therefore, the true scope of the present disclosure will be defined only by claims.

What is claimed is:

1. A trunk switch assembly integrated with an emblem, comprising:
   a body;
   an emblem knob that is coupled with an outer side of the body such that an emblem is disposed on an outer surface of the emblem knob, and provided with a switch operating rib;
   a micro switch that is housed in a switch case that is provided in the body;
   a pad that is provided between the emblem knob and the body and coupled to two link portions, each of the two link portions having one part transferring a vertical motion of the emblem knob at the same stroke as that of the vertical motion;
   a return spring that is provided on the body to apply the pressing or restoration operating force of the emblem knob; and
   a link plate that is provided between the body and the switch case and rotatably connected with the link portions to move together with the link portions,
   wherein the switch operating rib enables the micro switch to operate according to the pressing motion of the emblem knob,
   wherein the link portions are connected with both sides of the pad, via one end of each of the link portions, and
   wherein one of the link portions includes
   a first link that has one end connected with the pad and the other end to which a first hinge point is coupled, and a third link that has one end connected with one part of the first link and the other end to which a second hinge point is coupled; and
   wherein the other of the link portions includes a second link that has one end rotatably connected with the first hinge point of the first link and the other end connected with the link plate, and a fourth link that has one end rotatably connected with the second hinge point of the third link and the other end connected with the link plate.

2. The trunk switch assembly integrated with an emblem according to claim 1, wherein the first link moves horizontally by a vertical force transferred from the outer side of the emblem knob and transfers force to the first hinge point, the first hinge point rotates by the force transferred from the first link, the second link moves horizontally by the rotation of the first hinge point and transfers force to the link plate horizontally, the fourth link moves horizontally by a horizontal force transferred from the link plate and transfers force to the second hinge point, the second hinge point rotates by the force transferred from the fourth link, and the third link moves vertically by the rotation of the second hinge point.

3. The trunk switch assembly integrated with an emblem according to claim 1, wherein the pad is made of a rubber material to prevent moisture from coming into the micro switch.

4. The trunk switch assembly integrated with an emblem according to claim 1, wherein an outer circumference of the emblem knob is provided with a decoration, and a waterproof ring for waterproof is provided between the decoration and the emblem knob.

5. The trunk switch assembly integrated with an emblem according to claim 1, wherein the body is provided with a drain hole to discharge moisture introduced thereinto.

6. The trunk switch assembly integrated with an emblem according to claim 5, wherein the drain hole is provided in plural.

7. The trunk switch assembly integrated with an emblem according to claim 1, wherein guide holes that extend inwardly from the body and have an hollow inside are provided and the emblem knob is provided with guide members that extend from the emblem knob to be inserted into the guide holes so as to prevent the emblem knob from shaking when the emblem knob is pressed.

8. The trunk switch assembly integrated with an emblem according to claim 7, wherein the guide holes are each provided at both sides of the body and the guide members are each provided at both sides of the emblem knob so as to prevent the emblem knob from shaking left and right when the emblem knob is pressed.

9. The trunk switch assembly integrated with an emblem according to claim 1, wherein the switch operating rib extends inwardly from the emblem knob, and each of the pad and the body is provided with a switch guide hole of which the inside is hollow so as to guide the switch operating rib, such that the switch operating rib moves vertically through the switch guide hole by the pressing operation of the emblem knob to press and operate the micro switch.

10. The trunk switch assembly integrated with an emblem according to claim 1, further comprising:

a sealing groove provided around the emblem knob to prevent the introduction of foreign substances.

* * * * *